(12) United States Patent
Fujiki et al.

(10) Patent No.: US 7,381,260 B2
(45) Date of Patent: Jun. 3, 2008

(54) THIAZINEINDIGO PIGMENT DISPERSANT, AND PIGMENT COMPOSITION, COLORED COMPOSITION AND COLOR FILTER, USING THE SAME

(75) Inventors: Masayuki Fujiki, Tokyo (JP); Shoko Goto, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 11/785,473

(22) Filed: Apr. 18, 2007

(65) Prior Publication Data

US 2007/0251425 A1 Nov. 1, 2007

(30) Foreign Application Priority Data

Apr. 28, 2006 (JP) .............................. 2006-125747

(51) Int. Cl.
| | |
|---|---|
| C09B 67/20 | (2006.01) |
| C09B 67/22 | (2006.01) |
| C09B 7/12 | (2006.01) |
| C08K 5/16 | (2006.01) |
| C07D 279/00 | (2006.01) |
| C07D 279/10 | (2006.01) |
| C09D 7/00 | (2006.01) |
| C09D 7/12 | (2006.01) |

(52) U.S. Cl. ...................... 106/498; 106/493; 106/494; 106/495; 106/497; 430/7; 524/87; 544/58.4; 353/84

(58) Field of Classification Search ................. 106/493, 106/494, 495, 497, 498; 430/7; 524/87; 544/58.4; 353/84
See application file for complete search history.

(56) References Cited

U.S. PATENT DOCUMENTS

| | | | |
|---|---|---|---|
| 6,200,378 B1 * | 3/2001 | Piastra et al. ............... | 106/498 |
| 6,339,084 B1 * | 1/2002 | Kaul et al. ............... | 514/224.2 |
| 6,472,527 B1 * | 10/2002 | Borchert et al. ........... | 544/58.4 |
| 6,638,996 B1 * | 10/2003 | Kaul et al. .................... | 524/87 |
| 6,821,335 B2 * | 11/2004 | Winter et al. ............... | 106/498 |
| 2004/0060478 A1 | 4/2004 | Weber et al. | |
| 2006/0118004 A1 * | 6/2006 | Piastra et al. ............... | 106/498 |

FOREIGN PATENT DOCUMENTS

| | | |
|---|---|---|
| DE | 101 06 147 A1 | 8/2002 |
| JP | 3-26767 | 2/1991 |
| JP | 5-331398 | 12/1993 |
| JP | 6-316676 | 11/1994 |
| JP | 2003-303688 | 10/2003 |

OTHER PUBLICATIONS

Hays, "Surface Treatment of Organic Pigments for Printing Ink Applications", American Inkmaker, MacNair-Dorland, New York, NY, vol. 62, No. 6, Jun. 1984, pp. 28-50, XP009045503; ISSN: 0002-8916.

* cited by examiner

*Primary Examiner*—Anthony J. Green
(74) *Attorney, Agent, or Firm*—Nixon & Vanderhye P.C.

(57) ABSTRACT

A thiazineindigo pigment dispersant represented by Formula (1) or (2):

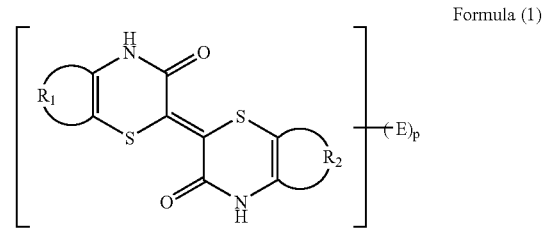

Formula (1)

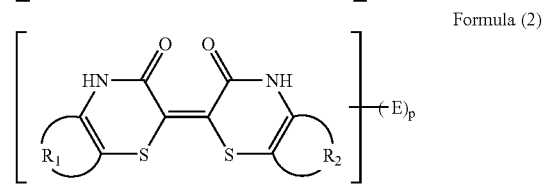

Formula (2)

where E denotes a basic group. A pigment composition contains a pigment material, and the thiazine indigo pigment dispersant. A colored composition contains the pigment composition and a pigment carrier. A color filter includes a filter segment prepared from the colored composition.

22 Claims, 2 Drawing Sheets

THIAZINEINDIGO PIGMENT DISPERSANT, AND PIGMENT COMPOSITION, COLORED COMPOSITION AND COLOR FILTER, USING THE SAME

CROSS-REFERENCE TO RELATED APPLICATIONS

This application is based upon and claims the benefit of priority from prior Japanese Patent Application No. 2006-125747, filed Apr. 28, 2006, the entire contents of which are incorporated herein by reference.

BACKGROUND OF THE INVENTION

1. Field of the Invention

The present invention relates to a pigment dispersant which can be suitably used in, for example, a printing ink, a paint, a resin colorant, an ink jet ink or an ink for a color filter, as well as a pigment composition and a colored composition, containing the same. Also, the present invention relates to a color filter which can be used in, for example, a color liquid crystal display device or a color image pickup device.

2. Description of the Related Art

In a printing ink or a paint, for example, aptitudes of prints or coatings such as clear color tone and high gloss are brought about by dispersing pigments in a fine state to enhance coloring power of the pigments. Further, labors and energies can be saved in producing a printing ink or a paint, by dispersing pigments in a stable state. A pigment dispersion in a stable state is generally excellent in storage stability.

However, pigments used in a printing ink or a paint are often in a finely divided form in order to realize a clearer color tone, and thus the cohesion between the pigment particles are enhanced, resulting difficulty to obtain the above-mentioned aptitudes.

In order to overcome these problems, a pigment dispersant is used to enhance the affinity between the pigments and the vehicle, thereby stabilizing the pigment dispersion, and various pigment dispersants have been disclosed.

For example, as pigment dispersants, pigment derivatives in which a functional group such as an acidic group, a basic group or phthalimido group is introduced into an organic pigment have been developed, and some advantages have been obtained (see Jpn. Pat. Appln. KOKAI Publication Nos. 3-26767, 6-316676 and 5-331398). However, pigment derivatives have an organic pigment as a matrix structure, and thus exert an inherent, strong coloring. Therefore, they are sometimes subject to many restrictions when they are used in pigments different therefrom in hue.

For example, in a system in which highly micronized pigment particles are dispersed, such as a printing ink, a paint, and in particular, ink jet ink and ink for a color filter, the amount of pigment dispersant used tend to be increased in order to weakening the cohesion between the pigment particles and obtain a stability with time, adversely affecting the clearness.

Further, when dissimilar pigments are mixed and dispersed, or inks each made using dissimilar pigments are mixed, color irregularities in colored matters, and remarkable decrease in coloring power are caused sometimes to occur due to adverse phenomena such as increase in viscosity, color flooding and floating, and sedimentation, which do not occur in single pigments.

BRIEF SUMMARY OF THE INVENTION

It is an object of the present invention to provide a pigment dispersant which exerts an excellent dispersing performance on a wide variety of pigments without adversely affecting hue and clearness, while having high dispersing power.

It is another object of the present invention to provide a pigment composition in which the hue and clearness of the pigment are not impaired and which exhibits an excellent dispersibility in a pigment carrier.

It is a further object of the present invention to provide a colored composition suitably used in, for example, a printing ink, a paint, an ink jet ink or an ink for a color filter, which is excellent in fluidity and storage stability as well as in gloss when it is formed into a dried film.

According to a first aspect of the present invention, there is provided a trans-thiazineindigo pigment dispersant represented by Formula (1) below.

According to a second aspect of the present invention, there is provided a cis-thiazineindigo pigment dispersant represented by Formula (2) below.

Formula (1):

Formula (2):

In Formulas (1) and (2):

Each $R_1$ independently denotes a group required to form an aromatic or aliphatic carbocyclic ring or a heterocyclic ring which may have a substituent other than the $-(E)_p-$ group;

Each $R_2$ independently denotes a group required to form an aromatic or aliphatic carbocyclic ring or a heterocyclic ring which may have a substituent other than the $-(E)_p-$ group;

Each E independently denotes a basic group substituted on the carbocyclic ring or heterocyclic ring including. $R_1$ and/or on the carbocyclic ring or heterocyclic ring including $R_2$ and is represented by Formula (3) or Formula (4):

Formula (3)

-continued

Formula (4)

X denotes —S—, —O—, —SO$_2$—, —CO—, —SO$_2$NR—, —NRSO$_2$—, —CONR—, —CH$_2$NRCOCH$_2$NR— or —(CH$_2$)$_m$NH—, wherein each R independently denotes a hydrogen atom, an alkyl group having 1 to 20 carbon atoms, which may have a substituent, an alkenyl group having 2 to 20 carbon atoms, which may have a substituent, or an aryl group having 6 to 20 carbon atoms, which may have a substituent, and m denotes an integer of 1 to 10;

a denotes 0 or 1;

Y denotes an alkylene group having 1 to 20 carbon atoms, which may have a substituent, an alkenylene group having 2 to 20 carbon atoms, which may have a substituent, an arylene group having 6 to 20 carbon atoms, which may have a substituent, or a heterocyclic group containing a nitrogen, oxygen or sulfur atom, or two or more of these groups may be bonded together directly or through a linking group selected from —NR—, —O—, —SO$_2$— and —CO—, wherein R is as defined above;

b denotes 0 or 1;

$R_3$ and $R_4$ each independently denotes an alkyl group having 1 to 30 carbon atoms, which may have a substituent, or an alkenyl group having 2 to 30 carbon atoms, which may have a substituent, or $R_3$ and $R_4$, taken together, may form a heterocyclic group containing a nitrogen, oxygen or sulfur atom;

Z denotes —CH$_2$NR'COCH$_2$NR'—, —CH$_2$NR'COCH$_2$NR'-G-, —NR'—, —NR'-G-CO—, —NR'-G-CONR'—, —NR'-G-SO$_2$—, —NR'-G-SO$_2$NR'—, —O-G-CO—, —O-G-CONR'—, —SO$_2$—, —O-G-SO$_2$— or —O-G-SO$_2$NR'—, wherein each R' independently denotes a hydrogen atom, an alkyl group having 1 to 20 carbon atoms, which may have a substituent, an alkenyl group having 2 to 20 carbon atoms, which may have a substituent, or an aryl group having 6 to 20 carbon atoms, which may have a substituent, and each G independently denotes an alkylene group having 1 to 20 carbon atoms, which may have a substituent, an alkenylene group having 2 to 20 carbon atoms, which may have a substituent, or an arylene group having 6 to 20 carbon atoms, which may have a substituent;

c denotes 0 or 1;

$R_5$, $R_6$, $R_7$ and $R_8$ each independently denotes a hydrogen atom, an alkyl group having 1 to 20 carbon atoms, which may have a substituent, an alkenyl group having 2 to 20 carbon atoms, which may have a substituent, or an aryl group having 6 to 20 carbon atoms, which may have a substituent;

$R_9$ denotes a hydrogen atom, an alkyl group having 1 to 20 carbon atoms, which may have a substituent or an alkenyl group having 2 to 20 carbon atoms, which may have a substituent; and p denotes an integer of 1 to 6.

According to a third aspect of the present invention, there is provided a pigment composition comprising a pigment material, and a trans- or cis-thiazineindigo pigment dispersant according to the present invention.

According to a fourth aspect of the present invention, there is provided a colored composition comprising a pigment composition according to the present invention, and a pigment carrier.

Further, according to a fifth aspect of the present invention, there is provided a color filter comprising a filter segment prepared from a colored composition according to the present invention.

DETAILED DESCRIPTION OF THE INVENTION

First, trans- and cis-thiazineindigo pigment dispersants according to the present invention will be described.

A trans-thiazineindigo pigment dispersant according to the present invention is represented by Formula (1) above, and cis-thiazineindigo pigment dispersant according to the present invention is represented by Formula (2) above.

In Formulas (1) and (2), the symbols and suffixes have the following meanings.

Each $R_1$ independently denotes a group required to form an aromatic or aliphatic carbocyclic ring or a heterocyclic ring which may have a substituent other than the -(E)$_p$-group. Likewise, each $R_2$ independently denotes a group required to form an aromatic or aliphatic carbocyclic ring or a heterocyclic ring which may have a substituent other than the -(E)$_p$-group. Examples of the substituent, which the ring containing $R_1$ or $R_2$ may have, include, for example, a halogen atom, and nitro, cyano, trifluoromethyl, carbonamide, alkyl, alkoxy, amino, alkylamino, thioalkyl, phenoxy, phenylamino, phenylthio, acyl, acyloxy and acylaminearyl groups. The ring containing R1 or R2 is preferably an aromatic carbocyclic ring which may have a substituent other than the -(E)$_p$-group, more preferably a benzene ring which may have a substituent other than the -(E)$_p$-group, and most preferably a benzene ring which does not a substituent other than the -(E)$_p$-group.

Each E independently denotes a basic group substituted on the ring containing $R_1$ and/or the ring containing $R_2$ and is represented by Formula (3) or Formula (4) noted above. Each p denotes an integer of 1 to 6, preferably 1 to 4, most preferably 1 or 2.

In Formulas (3) and (4), the symbols and suffixes have the following meanings.

X denotes —S—, —O—, —SO$_2$—, —CO—, —SO$_2$NR—, —NRSO$_2$—, —CONR—, —CH$_2$NRCOCH$_2$NR— or —(CH$_2$)$_m$NH—. Each R independently denotes a hydrogen atom, an alkyl group having 1 to 20 carbon atoms, preferably 1 to 10 carbon atoms, most preferably 1 to 6 carbon atoms, which may have a substituent, an alkenyl group having 2 to 20 carbon atoms, preferably 2 to 10 carbon atoms, most preferably 2 to 6 carbon atoms, which may have a substituent, or an aryl group having 6 to 20 carbon atoms, preferably 6 to 10 carbon atoms, most preferably 6 carbon atoms, which may have a substituent. The suffix m denotes an integer of 1 to 10.

The suffix a denote 0 (the absence of X) or 1 (the presence of X).

Y denotes an alkylene group having 1 to 20 carbon atoms, preferably 1 to 10 carbon atoms, most preferably 1 to 6 carbon atoms, which may have a substituent, an alkenylene group having 2 to 20 carbon atoms, preferably 2 to 10 carbon atoms, most preferably 2 to 6 carbon atoms, which may have a substituent, an arylene group having 6 to 20 carbon atoms, preferably 6 to 10 carbon atoms, most preferably 6 carbon atoms, which may have a substituent, or a heterocyclic group containing a nitrogen, oxygen or sulfur atom. Two or more of these groups may be bonded together directly or through a linking group selected from —NR—, —O—, —SO$_2$— and —CO—, wherein R is as defined above. Y is preferably unsubstitued.

The suffix b denotes 0 (the absence of Y) or 1 (the presence of Y).

$R_3$ and $R_4$ each independently denotes an alkyl group having 1 to 30 carbon atoms, preferably 1 to 25 carbon atoms, most preferably 1 to 20 carbon atoms, which may have a substituent, or an alkenyl group having 2 to 30 carbon atoms, preferably 2 to 25 carbon atoms, most preferably 2 to 20 carbon atoms, which may have a substituent. $R_3$ and $R_4$, taken together, may form a heterocyclic group containing a nitrogen, oxygen or sulfur atom. The substituents which $R_3$ and $R_4$ may have may include those substituents described with reference to the ring containing $R_1$ or the ring containing $R_2$ noted above. Each of $R_3$ and $R_4$ is preferably unsubstituted.

Z denotes —CH$_2$NR'COCH$_2$NR'—, —CH$_2$NR'COCH$_2$NR'-G-, —NR'—, —NR'-G-CO—, —NR'-G-CONR'—, —NR'-G-SO$_2$—, —NR'-G-SO$_2$NR'—, —O-G-CO—, —O-G-CONR'—, —SO$_2$—, —O-G-SO$_2$— or —O-G-SO$_2$NR'—. Each R' independently denotes a hydrogen atom, an alkyl group having 1 to 20 carbon atoms, preferably 1 to 10 carbon atoms, most preferably 1 to 6 carbon atoms, which may have a substituent, an alkenyl group having 2 to 20 carbon atoms, preferably 2 to 10 carbon atoms, most preferably 2 to 6 carbon atoms, which may have a substituent, or an aryl group having 6 to 20 carbon atoms, preferably 6 to 10 carbon atoms, most preferably 6 carbon atoms, which may have a substituent. Each G independently denotes an alkylene group having 1 to 20 carbon atoms, preferably 1 to 10 carbon atoms, most preferably 1 to 6 carbon atoms, which may have a substituent, an alkenylene group having 2 to 20 carbon atoms, preferably 2 to 10 carbon atoms, most preferably 2 to 6 carbon atoms, which may have a substituent, or an arylene group having 6 to 20 carbon atoms, preferably 6 to 10 carbon atoms, most preferably 6 carbon atoms, which may have a substituent. The substituents which R' and G may have may include those substituents described with reference to the ring containing $R_1$ or the ring containing $R_2$ noted above. Each of R' and G is preferably unsubstitued.

The suffix c denotes 0 (the absence of Z) or 1 (the presence of Z).

$R_5$, $R_6$, $R_7$ and $R_8$ each independently denotes a hydrogen atom, an alkyl group having 1 to 20 carbon atoms, preferably 1 to 10 carbon atoms, most preferably 1 to 6 carbon atoms, which may have a substituent, an alkenyl group having 2 to 20 carbon atoms, preferably 2 to 10 carbon atoms, most preferably 2 to 6 carbon atoms, which may have a substituent, or an aryl group having 6 to 20 carbon atoms, preferably 6 to 10 carbon atoms, most preferably 6 carbon atoms, which may have a substituent. Each of $R_5$, $R_6$, $R_7$ and $R_8$ is preferably unsubstituted.

$R_9$ denotes a hydrogen atom, an alkyl group having 1 to 20 carbon atoms, preferably 1 to 10 carbon atoms, most preferably 1 to 6 carbon atoms, which may have a substituent, or an alkenyl group having 2 to 20 carbon atoms, preferably 2 to 10 carbon atoms, most preferably 2 to 6 carbon atoms, which may have a substituent. $R_9$ is preferably unsubstituted.

In one embodiment, the thiazineindigo moiety in the trans-thiazineindigo pigment dispersant of the present invention is represented by Formula (A):

Further, in one embodiment, the thiazineindigo moiety in the cis-thiazineindigo pigment dispersant of the present invention is represented by Formula (B):

In one embodiment, —(X)$_a$—(Y)$_b$— group in Formula (3) is —SO$_2$—, —S—C$_1$-C$_6$-alkylene-, —SO$_2$NH—C$_1$-C$_6$-alkylene-, —SO$_2$—NH-phenylene-CO—, —CH$_2$NHCOCH$_2$NH—C$_1$-C$_6$-alkylene-, —C$_1$-C$_6$-alkylene-, or —(CH$_2$)$_m$NH—C$_1$-C$_6$-alkylene-. In one embodiment, R3 and R4 in Formula (3) are each independently a C$_1$-C$_6$-alkyl or a C$_1$-C$_{20}$-alkenyl, or R3 and R4 form a 5-membered or 6-membered nitrogen-containing heterocyclic ring (e.g., a pyrrolidine ring or a piperidine ring) which may have a substituent such as a hydroxyl group or a C$_1$-C$_6$-alkyl, together with the nitrogen atom to which they are bonded.

In one embodiment, -Z-group in Formula (4) is —SO$_2$—, —CH$_2$NHCOCH$_2$NH—, —CH$_2$NHCOCH$_2$NH—C$_1$-C$_6$-alkylene-, or —NH(C$_1$-C$_6$-alkylene)-SO$_2$—. In one embodiment, $R_5$-$R_8$ in Formula (4) are each independently a hydrogen atom, and $R_9$ is a hydrogen atom or a C$_1$-C$_6$-alkyl.

Illustrative examples of the trans-thiazineindigo pigment dispersants of the present invention are represented by Formulas (i) to (xxix) given below.

Formula (i):

Formula (ii):

Formula (iii):

Formula (iv):

Formula (v):

Formula (vi):

Formula (vii):

-continued

Formula (viii):

Formula (ix):

Formula (x):

Formula (xi):

Formula (xii):

Formula (xiii):

Formula (xiv):

-continued

Formula (xv):

Formula (xvi):

Formula (xvii):

Formula (xviii):

Formula (xix):

Formula (xx):

Formula (xxi):

-continued

Formula (xxii):

Formula (xxiii):

Formula (xxiv):

Formula (xxv):

Formula (xxvi):

Formula (xxvii):

Formula (xxviii):

Formula (xxix):

Illustrative examples of the cis-thiazineindigo pigment dispersant of the present invention are those represented by Formula (i) to (xxix) in which the trans-thiazineindigo moiety is replaced by the cis-thiazineindigo moiety of Formula (B).

The thiazineindigo pigment dispersant can be synthesized through several synthesizing routes.

For example, those trans-thiazineindigo pigment dispersants in which the —(X)a-(Y)b- group in Formula (3) is —SO$_2$— or —SO$_2$NH—C$_1$-C$_6$-alkylene- can be produced, for example, by chlorosulfonating the trans-thiazineindigo pigment represented by Formula (A) with chlorosulfuric acid by ordinary method, giving a trans-thiazineindigo sulfonyl chloride in which 1 to 6 chlorosulfonyl groups are substituted on the benzene ring or rings of the thiazineindigo, which is then reacted with an amine represented by HN(R$_3$)(R$_4$) or NH$_2$—C$_1$-C$_6$-alkylene-N(R$_3$)(R$_4$) and heated.

Those trans-thiazineindigo pigment dispersants in which the —(X)a-(Y)b-group in Formula (3) is —SO$_2$—NH-phenylene-CO— can be produced by reacting the trans-thiazineindigo sulfonyl chloride noted above with an aminobenzoic acid ester, and reacting the resulting product with an amine represented by HN(R$_3$)(R$_4$) (amidation) and heating the reaction product.

Those trans-thiazineindigo pigment dispersants in which the —(X)a-(Y)b-group in Formula (3) is —S—C$_1$-C$_6$-alkylene-can be produced by brominating the trans-thiazineindigo pigment represented by Formula (A) by ordinary method to give a trans-thiazineindigo bromide in which 1 to 6 bromine atoms are bonded on the benzene ring or rings of the thiazineindigo, which is then reacted with an amine represented by HS—C$_1$-C$_6$-alkylene-N(R$_3$)(R$_4$).

Those trans-thiazineindigo pigment dispersants in which the —(X)a-(Y)b-group in Formula (3) is —CH$_2$NHCOCH$_2$NH—C$_1$-C$_6$-alkylene- can be produced by reacting the trans-thiazineindigo pigment represented by Formula (A) with chloroacetamide and paraformaldehyde to give chloroacetamidomethyl trans-thiazineindigo in which 1 to 6 chloroacetamidomethyl groups are bonded to the benzene ring or rings of the thiazineindigo, which is then reacted with an amine represented by NH$_2$—C$_1$-C$_6$-alkylene-N(R$_3$)(R$_4$).

Those trans-thiazineindigo pigment dispersants in which the —(X)a-(Y)b-group in Formula (3) is C$_1$ C$_6$-alkylene- or —(CH$_2$)$_m$NH—C$_1$-C$_6$-alkylene- can be produced by reacting the trans-thiazineindigo pigment represented by Formula (A) with an amine represented by Hal-C$_1$-C$_6$-alkylene-N(R$_3$)(R$_4$) or Hal-(CH$_2$)$_m$NH—C$_1$-C$_6$-alkylene-N(R$_3$)(R$_4$), where Hal is a halogen, in the presence of a Lewis acid such as aluminum chloride (C-alkylation).

Further, those cis-thiazineindigo pigment dispersants in which the -Z- group in Formula (4) is —SO$_2$— can be produced by chlorosulfonating the cis-thiazineindigo pigment represented by Formula (B) with chlorosulfuric acid by ordinary method to give a cis-thiazineindigo sulfonyl chloride in which 1 to 6 chlorosulfonyl groups are substituted on the benzene ring or rings of the thiazineindigo, which is then reacted with an amine represented by H-(unsubstitued or substituted piperazine).

Those cis-thiazineindigo pigment dispersants in which the -Z- group in Formula (4) is —CH$_2$NHCOCH$_2$NH—C$_1$-C$_6$-alkylene- or —CH$_2$NHCOCH$_2$NH— can be produced by reacting the cis-thiazineindigo pigment represented by Formula (B) with chloroacetamide and paraformaldehyde to give chloroacetamidomethyl cis-thiazineindigo in which 1 to 6 chloroacetamidomethyl groups are bonded on the benzene ring or rings of the thiazineindigo, which is then reacted with an amine represented by NH$_2$—C$_1$-C$_6$-alkylene-(unsubstitued or substituted piperazine) or NH$_2$-(unsubstitued or substituted piperazine).

Those cis-thiazineindigo pigment dispersants in which the -Z- group in Formula (4) is —NH(C$_1$-C$_6$-alkylene)-SO$_2$— can be produced by brominating the cis-thiazineindigo pigment represented by Formula (B) by ordinary method to give a cis-thiazineindigo bromide in which 1 to 6 bromine atoms are bonded on the benzene ring or rings of the thiazineindigo, which is then reacted with an amine represented by NH$_2$(C$_1$-C$_6$-alkylene)-SO$_2$-(unsubstituted or substituted piperazine) in the presence of a catalyst such as palladium acetate.

Examples of amines which can be used in the reactions noted above include, for example, diethylamine, diethylaminoethanethiol, dimethylamine, N-ethylisopropylamine, N-methylbutylamime, N-methylisobutylamine, N-butylethylamine, N-tert-butylethylamine, diisopropylamine, dipropylamine, N-sec-butylpropylamine, dibutylamine, di-sec-butylamine, diisobutylamine, N-isobutyl-sec-butylamine, diamylamine, diisoamylamine, dihexylamine, di(2-ethylhexyl)amine, dioctylamine, N-methyloctylamine, N-methyloctadecylamine, didecylamine, diallylamine, N-ethyl-1,2-dimethlpropylamine, N-methylhexylamine, 2-hydroxymethylaminoethanol, dioleylamine, distearylamine, N,N-dimethylaminomethylamine, N,N-dimethylaminoethylamine, N,N-dimethylaminopropylamine, N,N-dimethylaminoamylamine, N,N-dimethylaminobutylamine, N,N-diethylaminoethylamine, N,N-diethylaminopropylamine, N,N-diethylaminohexylamine, N,N-diethylaminobutylamine, N,N-dimethylaminopentylamine, N,N-dipropylaminobutylamine, N,N-dibulylaminopropylamine, N,N-dibutylaminoethylamine, N,N-dibulylaminobutylamine, N,N-diisobutylaminopentylamine, N,N-methyl-laurylaminopropylamine, N,N-ethylhexylaminoethylamine, N,N-distearylaminoethylamine, N,N-dioleylaminoethylamine, N,N-distearylaminobutylamine, piperidine, 2-pipecoline, 3-pipecoline, 4-pipecoline, 2,4-lupetidine, 2,6-lupetidine, 3,5-lupetidine, 3-piperidinemethanol, pipecolic acid, isonipecotic acid, methyl isonipecotate, ethyl isonipecotate, 2-pyridinemethanol, pyrrolidine, 3-hydroxypyrrolidine, N-aminoethylpiperidine, N-aminoethyl-4-pipecoline, N-aminoethylmorpholine, N-aminopropylpiperidine, N-aminopropyl-2-pipecoline, N-aminopropyl-4-pipecoline, N-aminopropylmorpholine, N-methlpiperazine, N-butylpiperazine, N-methylhomopiperazine, 1-cyclopentylpiperazine, and 1-amino-4-methylpiperazine.

Usually, the thiazineindigo pigment dispersant prepared by the above methods may comprise compounds in which the number of the -(E)- group substituted on the thiazineindigo moiety is different. Thus, the value of "p" in Formula (1) or (2) may result in a fractional value, and in a value smaller than 1, when averaged. For example, when the pigment dispersant is prepared, the product may contain a thiazineindigo in which p is zero.

The thiazineindigo pigment dispersant of the present invention takes cis or trans form originating from the thiazineindigo moiety used. Each of the cis and trans form of thiazineindigo pigment dispersants of the invention is excellent in clearness; however, the trans-thiazineindigo pigment dispersant is more preferable because it is excellent also in viscosity characteristics. When the pigment material is dispersed, it is preferable to use the trans form and the cis form in a proportion of 50 to 100% by weight of the former and 50 to 0% by weight of the latter, more desirably 80 to 100% by weight of the former and 20 to 0% of the latter, based on the total amount of the trans and cis forms. It is most preferable to use the trans form only.

Next, a pigment composition according to the present invention will be described below.

A pigment composition according to the present invention contains a pigment material, and a trans- and/or cis-thiazineindigo pigment dispersant.

As the pigment material contained in the pigment composition of the present invention, use may be made of various commercially available organic or inorganic pigments.

Examples of the organic pigments include, for example, azo-based, anthanthrone-based, anthrapyrimidine-based, anthraquinone-based, isoindolinonoe-based, isoindoline-based, indanthrone-based, quinacridone-based, quinophtharone-based, dioxazine-based, diketopyrrolopyrrole-based, thiazineindigo-based, thioindigo-based, pyranthrone-based, phthalocyanine-based, fravanthrone-based, perinone-based, perylene-based, and benzimidazolone-based organic pigments. Examples of inorganic pigments include, for example, carbon black, titanium oxide, chrome yellow, cadmium yellow, cadmium red, red iron oxide, iron black, zinc flower, Prussian blue and ultramarine blue. These pigments can be used in combination.

The thiazineindigo pigment dispersant of the present invention is particularly effective to those pigments which have an analogous or similar chemical structure to that of the pigment dispersant of the invention in terms of non-aggregation, non-crystallization and good flowability. Further, from the aspect of hue, it is preferable to use the pigment dispersant of the invention for yellow to red pigments, more preferably for orange to red pigments.

In particular, it is preferable to use the pigment dispersant of the present invention for red pigments represented by diketopyrrolopyrrole red pigments, quinacridone red pigments, thiazineindigo red pigments and anthraquinone red pigments, since the pigment dispersant of the present invention exerts excellent dispersing effect on these red pigments, while keeping the color of such pigments themselves, and high clearness.

The thiazineindigo pigment dispersant of the present invention can be used in the pigment composition in an amount of preferably 0.1 to 30 parts by weight, more preferably 1 to 20 parts by weight, based on 100 parts by weight of the pigment material used. When the amount of the thiazineindigo pigment dispersant of the invention is smaller than 0.1 parts by weight, the effect of the thiazineindigo pigment dispersant used is difficult to be obtained. When the amount of the thiazineindigo pigment dispersant of the invention is larger than 30 parts by weight, not only the excessive portion of the pigment dispersant exhibits no advantages, but also the difference between the physical properties of the resultant pigment composition and the pigments alone sometimes becomes large, adversely affecting the practical quality when the resultant pigment composition is used for an ink or a paint.

The thiazineindigo pigment dispersant of the present invention exhibits a sufficient dispersing effect when it is simply mixed in a powder form with a powder of the pigment. However, a more excellent result will be produced, when the pigment composition is prepared by (i) mechanically mixing the pigment powder and the powder of pigment dispersant of the present invention, using a dissolver, a high speed mixer, a homomixer, a kneader, a roll mill, an attritor, a sand mill or a comminutor; (ii) adding a solution containing the pigment dispersant of the present invention to a suspension of the pigment in water or an organic solvent, thereby depositing the pigment dispersant on the surface of the pigment; (iii) co-dissolving the organic pigment and the pigment dispersant of the present invention in a solvent having a strong dissolving power, such as sulfuric acid, and co-depositing the pigment and the pigment dispersant, using a poor solvent, such as water.

Next, a colored composition according to the present invention will be explained below.

A colored composition according to the present invention contains a pigment composition according to the present invention and a pigment carrier. The pigment carrier is constituted by a resin, a precursor of the resin or a mixture thereof. When a color filter is prepared using the colored composition of the present invention, it is preferable to use, as the resin, a transparent resin having exhibits a light transmissivity of preferably 80% or more, more preferably 95% or more with respect to the whole visible wavelengths of 400 to 700 nm.

The resin includes a thermoplastic resin, a thermosetting resin and a photosensitive resin. The precursor of the resin includes a monomer and an oligomer which produces the resin upon curing by irradiation of radiation, and these can be used singly or in combination.

The pigment carrier can be used in an amount of 30 to 700 parts by weight, preferably 60 to 450 parts by weight, based on 100 parts by weight of the pigment composition used in the colored composition. When a mixture of the resin and the precursor of the resin is used as the pigment carrier, the resin can be used in an amount of 20 to 400 parts by weight, preferably 50 to 250 parts by weight, based on 100 parts by weight of the pigment composition used in the colored composition. The precursor of the resin can be used in an amount of 10 to 300 parts by weight, preferably 10 to 200 parts by weight, based on 100 parts by weight of the pigment composition used in the colored composition.

Examples of the thermoplastic resin include, for example, butyral resins, styrene-maleic acid copolymers, chlorinated polyethylenes, chlorinated polypropylenes, polyvinyl chlorides, vinyl chloride-vinyl acetate copolymers, polyvinyl acetates, polyurethane resins, polyester resins, acrylic resins, alkyd resins, polystyrenes, polyamide resins, rubber resins, cyclized rubber resins, celluloses, polyethylenes, polybutadienes, and polyimide resins.

Examples of the thermosetting resin include, for example, epoxy resins, benzoguanamine resins, rosin-modified maleic acid resins, rosin-modified fumaric acid resins, melamine resins, urea resins, and phenol resins.

Examples of the photosensitive resin include, for example, polymers having a photocrosslinkable group such as (meth)acryloyl or styryl, which are produced by introducing a (meth)acrylic compound or cinnamic acid having a reactive substituent such as an isocyanate group, an aldehyde group, or an epoxy group into a polymer having a reactive substituent such as a hydroxyl group, a carboxyl group or an amino group. In addition, polymers obtained by partial esterification of a styrene-maleic anhydride copolymer or a linear polymer containing an acid anhydride such as an α-olefin-maleic anhydride copolymer with a hydroxyl group-containing (meth)acrylic compound such as hydroxyalkyl (meth)acrylate can also be used.

Examples of the monomer and oligomer, which are precursors of the resins, include, for example, various acrylic and methacrylic acid esters such as methyl (meth)acrylate, ethyl(meth)acrylate, 2-hydroxyethyl(meth)acrylate, 2-hydroxypropyl(meth)acrylate, cyclohexyl(meth)acrylate, β-carboxy ethyl(meth)acrylate, polyethylene glycol di(meth)acrylate, 1,6-hexandiol glycidyl ether di(meth)acrylate, tripropyleneglycol di(meth)acrylate, trimethylolpropane tri(meth)acrylate, pentaerythritol tri(meth)acrylate, 1,6-hexanediol diglycidyl ether di(meth)acrylate, bisphenol A diglycidyl ether di(meth)acrylate, neopentylglycol diglycidyl ether di(meth)acrylate, dipentaerythritol hexa(meth)acrylate, tricyclodecanyl(meth)acrylate, (meth)acrylate of methylolmelamine, epoxy(meth)acrylate, and urethane acrylate; (meth)acryl acid; styrene; vinyl acetate; hydroxylethyl vinyl ether; ethyleneglycol divinyl ether; pentaerythritol trivinyl ether; (meth)acrylamide; N-hydroxymethyl (meth)acrylamide; N-binylformamide; and acrylonitrile.

The colored composition of the present invention may contain a dispersion aid such as a surfactant, or a resin type pigment dispersant, in order to dispersibility of the pigment material into the pigment carrier. The dispersion aid can be used in an amount of 0.1 to 40 parts by weight, preferably 0.1 to 30 parts by weight, based on 100 parts by weight of the pigment composition used.

Examples of the surfactant include, for example, anionic surfactants such as polyoxyethylene alkylether sulfate salts, sodium dodecylbenzenesulfonate, alkali salts of styrene-acryl acid copolymers, sodium alkylnaphthalenesulfonate, sodium alkyldiphenyletherdisulfonates, laurylsulfuric acid monoethanolamine, laurylsulfuric acid triethanolamine, ammonium laurylsulfate, stearic acid monoethanolamine, sodium stearate, sodium laurylsulfate, monoethanolamine salts of styrene-acryl acid copolymers, and polyoxyethylene alkylether phosphoric acid esters; nonionic surfactants such as polyoxyethylene oleylethers, polyoxyethylene laurylethers, polyoxyethylene nonylphenylethers, polyoxyethylene alkylether phosphoric acid esters, polyoxyethylene sorbitan monostearates, and polyethyleneglycol monolaurate; cationic surfactants such as quaternary alkyl ammonium salts and ethylene oxide adducts thereof; alkyl betaines such as alkyldimethylaminoacetic acid betaines; amphoteric surfactants such as alkylimidazolines; and other surfactants such as fluorosurfactants and silicone surfactants. These surfactants may be used alone or in combination.

The resin type pigment dispersant has a pigment-affinity portion having a property of adsorbing on a pigment, and a portion compatible with the pigment carrier, and functions to stabilize the dispersion of a pigment in the pigment carrier by being adsorbed on the pigment. Examples of the resin type pigment dispersant include linear or comb polyester, acrylic and urethane resins. Of these, linear resins having a basic group, acidic group or an aromatic group on their main chain or terminal, or comb resin having a basic group, acidic group or an aromatic group on their main chain or side chain are preferred.

Examples of commercially available resin type pigment dispersants include, for example, POLYFLOW No. 75, No. 90 and No. 95 (Kyoeisha Chemical Co.), MEGAFAC F171, F172 and F173 (Dainippon Ink & Chemicals, Inc.), FLUORAD FC430 and FC431 (Sumitomo 3M), SOLSPERSE dispersants such as SOLSPERSE 13240, 20000, 24000, 26000 and 28000 (Lubrisol Japan), DISPERBYK dispersants such as DISPERBYK 111, 160, 161, 162, 163, 164, 170, 182, 2000 and 2001 (Byk Chemie), AJISPER dispersants such as AJISPER PB711, PB411, PB111, PB814, PB821 and PB822 (Ajinomoto-Fine-Techno), and EFKA dispersants such as EFKA 46 and 47 (EFKA Chemicals).

The colored composition of the present invention contains a photopolymerization initiator when the composition is cured by UV irradiation or the like.

Examples of the photopolymerization initiator include, for example, acetophenone photopolymerization initiators such as 4-phenoxy-dichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenylketone, and 2-benzyl-2-dimethylamino-1-(4-morpholinophenyl)-butan-1-one; benzoin photopolymerization initiators such as benzoin, benzoin methylether, benzoin ethylether, benzoin isopropylether, and benzyldimethyl ketal; benzophenone photopolymerization initiators such as benzophenone, benzoylbenzoic acid, methyl benzoylbenzoate, 4-phenylbenzophenone, hydroxybenzophenone, acrylated benzophenones, and 4-benzoyl-4'-methyl diphenylsulfide; thioxanthone photopolymerization initiators such as thioxanthone, 2-chlorothioxanthone, 2-methylthioxanthone, isopropylthioxanthone, and 2,4-diisopropylthioxanthone; triazine photopolymerization initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphto-1-yl)-4,6-bis(trichloromethyl)-s-triazine, 2-(4-methoxy-naphto-1-yl)-4,6-bis(trichloromethyl)-s-triazine, 2,4-trichloromethyl-(piperonyl)-6-triazine, and 2,4-trichloromethyl(4'-methoxy styryl)-6-triazine; borate photopolymerization initiators; carbazole photopolymerization initiators; and imidazole photopolymerization initiators. The photopolymerization initiator may be used in an amount of 5 to 200 parts by weight, preferably 10 to 150 parts by weight, based on 100 parts by weight of the pigment composition used.

The photopolymerization initiators can be used alone or in combination, but may be used together with a sensitizer, such as α-acyloxime ester, acylphosphine oxide, methylphenyl glyoxylate, benzil, 9,10-phenanthrenequinone, camphorquinone, ethylanthraquinone, 4,4'-diethylisophthalophenone, 3,3',4,4'-tetra(t-butylperoxycarbonyl) benzophenone or 4,4'-diethylaminobenzophenone. The sensitizer may be used in an amount of 0.1 to 60 parts by weight, based on 100 parts by weight of the photopolymerization initiator used.

The colored composition according to the invention may contain a solvent in order to sufficiently disperse the pigment material into the pigment carrier and to make it easier to obtain a uniform coating. Examples of the solvent include, for example, cyclohexanone, propyleneglycol diacetate, propyleneglycol monomethyl ether, diethyleneglycol diethyl ether, methyl isobutyl keton, n-butyl alcohol, dipropyleneglycol monomethyl ether, tripropyleneglycol monomethyl ether, propyleneglycol monopropyl ether, dipropyleneglycol monopropyl ether, propyleneglycol monobutyl ether, dipropyleneglycol monobutyl ether, tripropyleneglycol monobutyl ether, propyleneglycol phenyl ether, dipropyleneglycol monomethyl ether acetate, 1,3-butyleneglycol diacetate, ethyleneglycol monobutyl ether, ethyleneglycol monobutyl ether acetate, diethyleneglycol monobutyl ether, diethyleneglycol monobutyl ether acetate, 3-methoxybutanol, 1,3-butyleneglycol, triacetin, 3,3,5-trimethyl-2-cyclohexen-1-one, ethyleneglycol monoethyl ether, γ-butyrolactone, isoamyl acetate, ethyl 3-ethoxypropionate, propylenecglycol monomethyl ether acetate, toluene, o-xylene, m-xylene, p-xylene, methyl 3-methoxypropionate, butyl acetate, isobutyl acetate, and propyl acetate. These solvents may be used alone or in combination. The total amount of the solvents used may be 800 to 4,000 parts by weight, preferably 1000 to 2500 parts by weight, based on 100 parts by weight of the pigment composition used.

The colored composition of the present invention can contain a storage stabilizer in order to stabilize the viscosity with time of the composition, and can contain an adhesion enhancer such as a silane coupling agent, in order to enhance the adhesion with the substrate.

The colored composition of the present invention may contain additives such as a thermal polymerization inhibitor, a plasticizer, a surface protecting agent, a smoothing agent, a coating aid, an adhesion improving agent or a development improving agent, if needed.

The colored composition of the present invention can be prepared by finely dispersing the pigment composition of the present invention, together with the dispersing aid and/or the photopolymerization initiator noted above, in the pigment carrier and the organic solvent, using a dispersing device such as a three-roll mill, a two-roll mill, a lateral sand mill, a vertical sand mill, an annular type bead mill, a kneader or an attritor. A colored composition containing two or more kinds of pigments can also be prepared by mixing mixtures each containing the pigment carrier and the organic solvent into which different pigment is finely dispersed using the thiazineindigo pigment dispersant of the present invention.

The colored composition can be prepared by mixing and dispersing all the components of the composition all together. However, it is preferable to disperse the pigment in a portion of the resin and/or the organic solvent, using the thiazineindigo pigment dispersant of the invention, then add the remaining components, and disperse the resultant mixture.

Further, before carrying out dispersing by means of, for example, a lateral sand mill, a vertical sand mill, an annular gap beads mill or an attritor, pre-dispersing using a milling mixer such as a kneader or a three-roll mill, solid dispersing using a two-roll mill, or a treatment of the pigment material with the thiazineindigo pigment dispersant may be conducted. Further, the stability of the colored composition can be improved, if a post-treatment, called aging, in which the colored composition is stored at 30-80° C. for a few hours to one week or a post-treatment using a ultrasonic disperser or a collision type beadless disperser, after the dispersing by a bead mill, etc. In addition, any disperser or a mixer such as a microfluidizer, a high speed mixer, a homomixer, a ball mill, a roll mill, a stone mill, or a ultrasonic disperser can be used to prepare a colored composition according to the present invention.

When the colored composition of he present invention is used to prepare a color filter, it is preferable to remove coarse grains of 5 μm or more, preferably 1 μm or more and more preferably 0.5 μm or more and mixed dusts by, e.g., a centrifugal separation, a sintered filter or a membrane filter.

The colored composition of the present invention can be prepared as a gravure-offset printing ink, a waterless offset printing ink, a silk screen printing ink, or a solvent-developing or alkali-developing resist material.

The solvent-developing or alkali-developing resist material comprises a thermoplastic resin, a thermosetting resin or a photosensitive resin and monomers, which are the pigment carrier, a photopolymerization initiator and a solvent, in which the pigment composition of the present invention is dispersed.

Further, the colored composition of the invention can exhibit an excellent dispersing effect and a stability with time, and provide a strongly colored matter when it is used for a wide variety of printing inks, paints, ink jet inks, and plastics colorants.

In this case, the colored composition can be prepared by the method noted above, using a resin such as petroleum resin, casein, shellac, a drying oil or a synthetic drying oil, and a solvent such as ethylcellosolve acetate, butylcellosolve acetate, ethylbenzene, ethyl acetate, methanol, ethanol, isopropyl alcohol, butanol, ethylene glycol, glycerin, N,N-dimethylformamide, SOLVESSO 100 (Exxon Chemical Co.), SWASOL 1000 (Maruzen Petrochemical Co.) or a petroleum solvent, in addition to the resin and the solvent noted above, together with a surfactant and/or a resin type pigment dispersant, if necessary, without using the monomer and the photopolymerization initiator.

A color filter according to the invention includes a transparent or reflective substrate and filter segments formed thereon in three different colors, R (red), G (green) and B (blue), or Y (yellow), M (magenta) and C (cyan). The filter segments in various colors can be formed by printing or photolithography, using a colored composition according to the present invention.

Examples of the transparent substrate include glass plates of quartz glass, borosilicate glass, alumina silicate salt glass, surface-silica-coated soda lime glass, and the like; and resin plates of polycarbonate, polymethyl methacrylate, polyethylene terephthalate, and the like.

Examples of the reflective substrate include silicon or other transparent substrates whereon a thin film of aluminum, silver, silver/copper/palladium alloy, or the like is formed.

For production of multi-color filter segments, a printing process is superior in mass-production efficiency, because it is possible to form patterns only by printing and drying a pattern repeatedly with the various colored compositions prepared above as printing inks. Further, progress in printing technology made it possible to print an extremely narrow pattern higher in dimensional accuracy and smoothness. For printing, preferable is a composition that is resistant to the drying and solidification of the ink on a printing plate or on a blanket. In addition, control of the fluidity of the ink in a printing machine is also important, and it is also possible to adjust the viscosity of the ink by using a dispersing agent or an extender pigment.

When filter segments in various colors are formed by photolithography, colored compositions prepared as the above-described solvent- or alkali-development-type color resist are coated on a transparent substrate to a dry film thickness of 0.2 to 5 µm by means of spray coating, spin coating, slit coating, roll coating, and the like. The film after drying is exposed as needed to ultraviolet ray via a mask having a predetermined pattern placed in the state in contact or not in contact with the film. Then, after a desired pattern is formed on the film by removing the unhardened area thereon, for example, by immersing the film in a solvent or an alkaline developing solution or spraying a developing solution onto the film via a spray nozzle. A color filter is produced by repeating similar operations for other colors. The film may be heated as needed for accelerate polymerization of the colored resist. Color filters higher in accuracy are produced by photolithography than by the printing process.

During development, an aqueous solution of sodium carbonate, sodium hydroxide, or the like is used as the alkaline developing solution, and additionally, an organic alkali such as dimethylbenzylamine and triethanolamine may also be used. In addition, an antifoaming agent or a surfactant may be added to the developing solution.

For improvement in the sensitivity of ultraviolet ray exposure, the color resist may be exposed to the ray after it is coated with a film for preventing the polymerization inhibition by oxygen, which is produced by coating the color resist with a water-soluble or alkali-soluble resin such as polyvinyl alcohol and a water-soluble acrylic resin and drying the resulting resist.

The color filter according to the invention can be produced by, in addition to the methods above, electrodeposition, transfer, or other method, and the colored composition according to the invention may be used in any of the methods. Electrodeposition is a method of forming a color filter by using a transparent conductive film formed on a transparent substrate and electrodepositing filter segments in various colors on the transparent conductive film by electrophoresis of colloid particles.

Alternatively, the transfer method is a method of forming a color filter layer previously on the surface of a removable transfer base sheet and transferring the color filter layer on to a desirable transparent substrate.

It is possible to raise the contrast of liquid crystal display panels further if a black matrix is formed on a transparent substrate or a reflective substrate in advance to the filter segments. Inorganic films of chromium, chromium/chromium oxide multilayer, titanium nitride, and the like and resin films containing a light-shielding agent dispersed therein are used as the black matrix, but the black matrix is not limited thereto. In addition, a thin film transistor (TFT) may be formed on the above-described transparent substrate or reflective substrate before formation of the filter segments. Filter segments formed on a TFT substrate expands the aperture ratio and thus improves the brightness of liquid crystal display panels.

An overcoat film, a columnar spacer, a transparent conductive film, a liquid crystal orientation film, or the like is formed on the color filter according to the invention as needed.

Such liquid crystal display panels are produced by bonding color filters on two opposing substrates with a sealant, injecting a liquid crystal from an injection port at the seal area, sealing the injection port, and adhering a polarization film or a phase difference film as needed on the outside surface of the two substrates.

The liquid crystal display panel can be used in the liquid crystal display mode for performing multicolor printing by using a color filter of twisted nematic (TN), super-twisted nematic (STN), in-plane-switching (IPS), vertically alignment (VA), optically compensated bend (OCB), or the like.

The present invention will be described by way of Examples below. In Examples, "parts" denotes parts by weight.

EXAMPLE 1

Synthesis of Pigment Dispersant B 30 parts of cis-thiazineindigo pigment represented by Formula (B) above were added to 300 parts of chlorosulfonic acid at room temperature. The mixture was stirred at room temperature for 7 hours, and then added dropwise to 1500 parts of ice water over 15 minutes. The precipitated cis-thiazineindigo sulfonylchloride was filtered, and washed with 3000 parts of ice water, affording cis-thiazineindigo sulfonylchloride press cake.

Into a 3 L-beaker, 500 parts of ice and 500 parts of water and 47.8 parts of diethylaminoethylamine were charged, and then, the cis-thiazineindigo sulfonyl chloride press cake was added at 2-5° C. Then, the mixture was heated to 60° C., and stirred for 90 minutes. The product was filtered, washed with water, and dried at 80° C., affording 43 parts of pigment dispersant B represented by Formula (xxx):

The molecular weight of pigment dispersant B, i.e., 696.93, was confirmed by a mass spectrometry. The purity was 61.38%, as determined by a high-performance liquid chromatography. The liquid chromatography was carried out under the conditions below:

Column: Symmetry C18 5 micron available from Waters;
Eluate:
(A) 0.05 mol/L CH3COONH4 aq/DMF=7/1 (v/v)
(B) DMF/Water=95/5 (v/v)
Gradient condisions:
  (A):(B)=80/20 (v/v), 5 min. keep—20 min.—(A):(B)=0:100, 15 min. keep;
Flow rate: 0.300 mL/min;
Injection volume: 5 µL
Oven temperature: 35° C.

Figure 1:
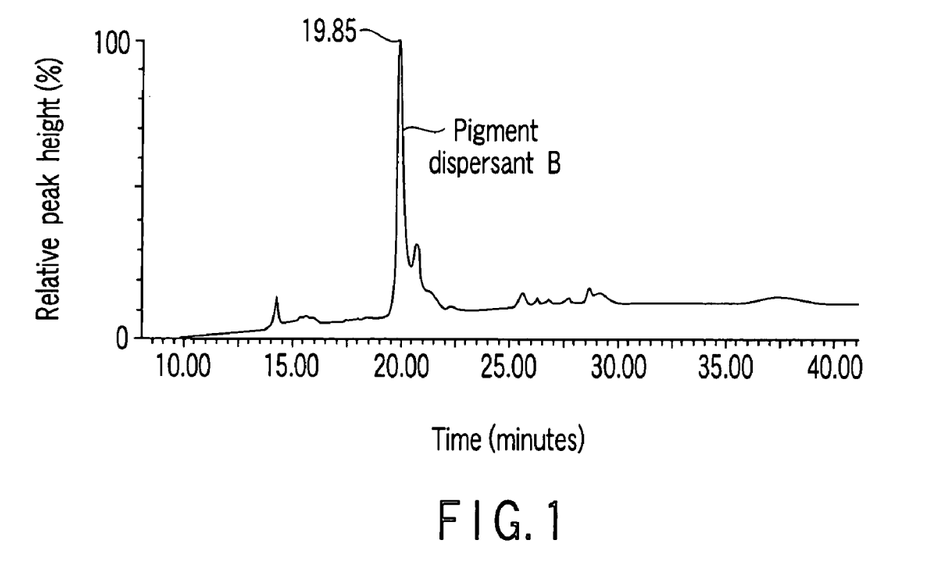
FIG. 1 illustrates a column liquid chromatogram of pigment dispersant B prepared in Example 1 which will be described below.

The chromatogram of pigment dispersant B is illustrated in FIG. 1.

EXAMPLE 2

Synthesis of Pigment Dispersant C

Into a 200 mL four-neck flask, 100 parts of N,N-dimethylformamide, and 20 parts of pigment dispersant B synthesized in Example 1 were charged. The mixture was stirred at 150° C. for 3 hours and then added dropwise to 800 parts of water. The product was filtered, washed with water and dried at 80° C., affording 16 parts of pigment dispersant C represented by Formula (vii) above.

Figure 2:
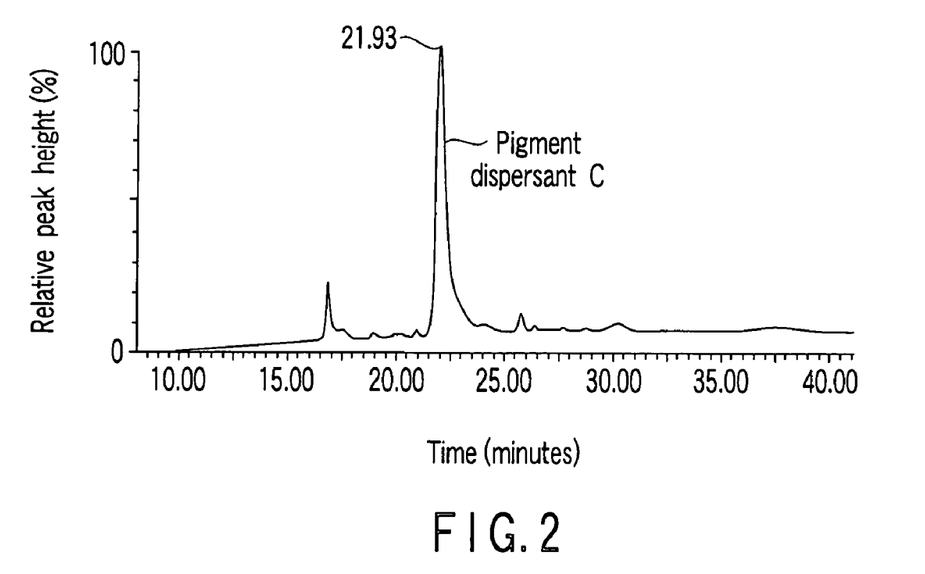
FIG. 2 illustrates a column liquid chromatogram of pigment dispersant C prepared in Example 2 which will be described below.

The molecular weight of pigment dispersant C, i.e., 696.93, was confirmed by a mass spectrometry. The purity was 81%, as determined by a column liquid chromatography. The liquid chromatography was carried out under the same conditions as in Example 1. The liquid column chromatogram of pigment dispersant C is illustrated in FIG. 2.

EXAMPLE 3

Synthesis of Pigment Dispersant D

Into a 200 mL four-neck flask, 100 parts of N,N-dimethylformamide and 20 parts of pigment dispersant B synthesized in Example 1 were charged. The mixture was stirred at 90° C. for 2 hours and then added dropwise to 800 parts of water, affording 16 parts of pigment dispersant composition (referred to as "pigment dispersant D") containing pigment dispersant B represented by Formula (xxx) and pigment dispersant C represented by Formula (vii) at a weight ratio of 1:2.

EXAMPLE 4

Synthesis of Pigment Dispersant E 30 parts of trans-thiazineindigo pigment represented by Formula (A) above and 150 parts of bromine were added to 100 parts of nitrobenzene. The mixture was stirred at 100° C. for 5 hours and excessive bromine was collected, affording a trans-thiazineindigo bromide.

30 parts of the trans-thiazineindigo bromide and 10 parts of diethylaminoethanethiol were added to 100 parts of N,N-dimethylformamide at room temperature, and the mixture was stirred at 150° C. for 5 hours. The product was filtered, washed with water and dried at 80° C., affording 38 parts of pigment dispersant E represented by Formula (i) above.

EXAMPLE 5

Synthesis of Pigment Dispersant F 27 parts of trans-thiazineindigo pigment represented by Formula (A) above were slowly added to 325 parts of 98% sulfuric acid cooled to 0° C. over 30 minutes or more, while keeping the temperature at 20° C. or less. Thereafter, 25 parts of 2-chloroacetamide were added over 20 minutes or more, and then 9 parts of paraformaldehyde were added over 20 minutes or more. The mixture was stirred at 15-20° C. for 4 hours, and then was allowed to stand overnight. The reaction mixture was poured into a mixture of 750 parts of ice and 1500 parts of water. The precipitates were filtered, and washed with 1000 parts of ice water 3 times, giving chloroacetamido cis-thiazineindigo press cake.

Into a 3 L beaker, 500 parts of ice, 500 parts of water and 51.6 parts of 1-(2-aminoethyl)piperazine were charged, and then the chloroacetamido cis-thiazineindigo press cake was added at 0-5° C. Then, the mixture was heated to 60° C. and stirred for 2 hours. The product was filtered, washed with water, and dried at 80° C., giving 47 parts of cis-thiazineindigo pigment dispersant. Further, 100 parts of N,N-dimethylformamide and 20 parts of the cis-thiazineindigo pigment dispersant were charged into a 200 mL four-neck flask. The mixture was stirred at 150° C. for 3 hours, and then added dropwise to 800 mL of water. The product was filtered, washed with water and dried at 80° C., affording 16 parts of pigment dispersant F represented by Formula (xxvii) above.

<Preparation of Acrylic Resin Solution>

700 parts of cyclohexanone were charged into a separable four-necked flask equipped with a thermometer, a condenser, a nitrogen gas inlet, a stirrer and a dropping funnel, and heated to 80° C. The atmosphere inside the flask was replaced with nitrogen, and then a mixture of 133 parts of n-butyl methacrylate, 46 parts of 2-hydroxyethyl methacrylate, 43 parts of methacrylic acid, 74 parts of p-cumylphenol ethylene oxide-modified acrylate ("Aronix M110", manufactured by Toagosei Co., Ltd.) and 4 parts of 2,2'-azobisisobutyronitrile was added dropwise through the dropping funnel over 2 hours. After the dropwise addition, the reaction was continued additionally for 3 hours, giving a solution of an acrylic resin having a weight-average molecular weight of 26,000. After the resin solution was cooled to room temperature, about 2 g of the resin solution was sampled and dried at 180° C. for 20 minutes, and the amount of the nonvolatiles was measured. Based on the result of the measurement, cyclohexanone was added to the remaining resin solution such that the nonvolatiles concentration became 20% by weight in the resin solution, affording a desired acrylic resin solution.

<Preparation of Treated Red Pigment>

A mixture of 300 parts of diketopyrrolopyrrole (hereinafter referred to as "DPP") red pigment (C. I. Pigment red 254; "IRGAPHOR RED B-CF" available from Chiba Specialty Chemicals), 1500 pats of sodium chloride and 150 parts of diethylene glycol was kneaded at 120° C. for 2 hours, using a one-gallon stainless steel kneader (available from Inoue Seisakusho). Then, the kneaded mixture was added to 5 liters of warm water, and stirred for an hour, while heating at 70° C., giving a slurry. The slurry was repeatedly filtered and washed with water to remove the sodium chloride and the diethylene glycol, and was dried at 80° C. overnight, affording 290 parts of treated red pigment.

<Preparation of Red/Yellow Mixed Pigment 1>

A DPP red pigment (C. I. Pigment red 254; "IRGAPHOR RED B-CF" available from Chiba Specialty Chemicals), an anthraquinone red pigment (C. I. Pigment red 177; "CHROMOPHTAL RED A2B" available from Chiba Specialty Chemicals) and an azo yellow pigment (C. I. Pigment yellow 150; "YELLOW PIGMENT E4GN-GT" available from Lanxess K.K.) were mixed at a weight ratio of 3:5:2, affording red/yellow mixed pigment 1.

<Preparation of Red/Yellow Mixed Pigment 2>

DPP red pigment (C. I. Pigment red 254; "IRGAPHOR RED B-CF" available from Chiba Specialty Chemicals) and azo yellow pigment (C. I. Pigment yellow 150; "YELLOW PIGMENT E4GN-GT" available from Lanxess K.K.) were mixed at a weight ratio of 3:1, affording red/yellow mixed pigment 2.

<Synthesis of Pigment Dispersant A>

The compound represented by Formula (xxxi) below was chlorosulfonated by an ordinary method. The resultant compound, 50 parts, was dispersed in 900 parts of water, and then, 240 parts of N,N-diethylaminoethylamine were added. The mixture was heated to 60° C., and stirred at that temperature for 2 hours. The precipitates were filtered, washed with water and dried at 80° C., affording 60 parts of pigment dispersant A.

Formula (xxxi):

EXAMPLES 6-25 AND COMPARATIVE EXAMPLES 1-14

The pigments, pigment dispersants A-F, the acrylic resin solution and a solvent (cyclohexanone) in amounts indicated in Tables 1A to 1C were charged in a 140 mL screw capped bottle, to which 150 g of zirconia beads 1.25 mm in diameter were added. The mixture was dispersed using a paint conditioner for 10 minutes, affording colored compositions.

<Evaluation of Colored Composition>

The viscosity and the thixotropy index value (TI value) of each colored composition were measured at 25° C., using a B type viscometer.

Each colored composition was coated on a PET film to a wet thickness of 12 μm and dried at 150° C. for 2 minutes, forming a coating film. The color of the coating film was measured, using a spectrophotometric calorimeter (SE-2000 available from Nippon Denshoku Industries), evaluating the clearness. Incidentally, the clearness was expressed by the difference between the chromaticness C of each coating film and the chromaticness C of a coating film prepared from each corresponding colored composition in which no pigment dispersant of the invention was used, with the chromaticness C of the composition without the pigment dispersion used as a standard, i.e., zero.

Further, each colored composition was stored at 40° C. for one week, and then its viscosity was measured at 25° C., using a B type viscometer.

The viscosity stability with time was rated and the rating was expressed by (little increase in viscosity), ○ (the colored composition could be used without problem, though slight increase in viscosity was observed), Δ (increase in viscosity was observed, and the colored composition could not be used), and X (remarkable increase in viscosity was observed, and the colored composition could not be used)

These results are shown in Tables 1A to 1C.

As shown in Tables 1A to 1C, the colored composition using the pigment dispersant of the invention are improved in clearness, and in particular, the colored compositions using the trans-thiazineindigo pigment dispersant of the invention are low in viscosity, small in thixotropic property, and exhibit excellent fluidity. The colored compositions of the invention are excellent also in the storage stability with time.

TABLE 1A

| | Components | | | | | | Evaluations | | | | |
| | Pigment (*1) | | Pigment dispersant | | Acrylic resin solution | Solvent | Viscosity | | | | Storage stability |
| Ex. No. | Kind | Amount (g) | Kind | Amount (g) | Amount (g) | Amount (g) | 6 rpm | 60 rpm | TI value | Clearness (ΔC) | with time |
| Comp. Ex. 1 | C.I. Pigment Red 254 | 12.0 | None | — | 25.7 | 43.5 | 4142 | 1890 | 2.19 | 0 | X |
| Comp. Ex. 2 | | 10.8 | A | 1.2 | 25.7 | 42.3 | 85 | 67.5 | 1.26 | −3.1 | ○ |
| Ex. 1 | Treated red pigment | 10.8 | B | 1.2 | 25.7 | 42.3 | 198 | 160 | 1.24 | −0.3 | Δ |
| Ex. 2 | | 10.2 | B | 1.8 | 25.7 | 41.7 | 243 | 210 | 1.16 | −0.2 | Δ |
| Ex. 3 | | 11.4 | B | 0.6 | 25.7 | 42.9 | 232 | 179 | 1.30 | −0.8 | Δ |
| Ex. 4 | | 11.4 | C | 0.6 | 25.7 | 42.9 | 154 | 125 | 1.23 | −0.8 | ○ |
| Ex. 5 | | 10.8 | C | 1.2 | 25.7 | 42.3 | 91 | 76 | 1.20 | −0.7 | ◉ |
| Ex. 6 | | 10.2 | C | 1.8 | 25.7 | 41.7 | 137 | 125 | 1.10 | −0.6 | ○ |
| Ex. 7 | | 10.8 | D | 1.2 | 25.7 | 42.3 | 135 | 99 | 1.36 | −0.5 | ◉ |
| Ex. 8 | | 10.8 | E | 1.2 | 25.7 | 42.3 | 103 | 95 | 1.08 | −0.8 | ◉ |

TABLE 1B

| | Components | | | | | | Evaluations | | | | |
| | Pigment (*1) | | Pigment dispersant | | Acrylic resin solution | Solvent | Viscosity | | | | Storage stability |
| Ex. No. | Kind | Amount (g) | Kind | Amount (g) | Amount (g) | Amount (g) | 6 rpm | 60 rpm | TI value | Clearness (ΔC) | with time |
| Camp. Ex. 3 | C.I. Pigment Red 202 | 12.0 | None | — | 25.7 | 43.5 | 2355 | 526 | 4.48 | 0 | X |
| Ex. 9 | | 10.8 | C | 1.2 | 25.7 | 42.3 | 98 | 77 | 1.27 | −0.3 | ○ |
| Ex. 10 | | 10.8 | F | 1.2 | 25.7 | 42.3 | 94 | 85 | 1.11 | −0.6 | ○ |
| Comp. Ex. 4 | C.I. Pigment Red 122 | 12.0 | None | — | 25.7 | 43.5 | 926 | 402 | 2.30 | 0 | X |
| Ex. 11 | | 10.8 | C | 1.2 | 25.7 | 42.3 | 79 | 64 | 1.23 | −0.4 | ◉ |
| Ex. 12 | | 10.8 | E | 1.2 | 25.7 | 42.3 | 89 | 76 | 1.17 | −0.6 | ○ |

TABLE 1B-continued

| | Components | | | | | | Evaluations | | | | |
|---|---|---|---|---|---|---|---|---|---|---|---|
| | Pigment (*1) | | Pigment dispersant | | Acrylic resin solution | Solvent | Viscosity | | | Clearness | Storage stability with time |
| Ex. No. | Kind | Amount (g) | Kind | Amount (g) | Amount (g) | Amount (g) | 6 rpm | 60 rpm | TI value | (ΔC) | |
| Comp. Ex. 5 | Red/yellow mixed pigment 1 | 12.0 | None | — | 25.7 | 43.5 | 1154 | 844 | 1.37 | 0 | X |
| Comp. Ex. 6 | | 10.8 | A | 1.2 | 25.7 | 43.5 | 87 | 76 | 1.14 | −3.7 | ○ |
| Ex. 13 | | 10.8 | C | 1.2 | 25.7 | 42.3 | 97 | 64 | 1.52 | −0.8 | ◎ |
| Ex. 14 | | 10.4 | B | 1.6 | 25.7 | 41.9 | 89 | 72 | 1.24 | −0.6 | Δ |

TABLE 1C

| | Components | | | | | | Evaluations | | | | |
|---|---|---|---|---|---|---|---|---|---|---|---|
| | Pigment (*1) | | Pigment dispersant | | Acrylic resin solution | Solvent | Viscosity | | | Clearness | Storage stability with time |
| Ex. No. | Kind | Amount (g) | Kind | Amount (g) | Amount (g) | Amount (g) | 6 rpm | 60 rpm | TI value | (ΔC) | |
| Comp. Ex. 7 | Red/yellow mixed pigment 2 | 12.0 | None | — | 25.7 | 43.5 | 1260 | 765 | 1.65 | 0 | X |
| Comp. Ex. 8 | | 10.8 | A | 1.2 | 25.7 | 43.5 | 86 | 77 | 1.12 | −4.1 | ○ |
| Ex. 15 | | 10.8 | C | 1.2 | 25.7 | 42.3 | 99 | 69 | 1.43 | −0.8 | ◎ |
| Ex. 16 | | 10.8 | E | 1.2 | 25.7 | 42.3 | 102 | 75 | 1.36 | −0.9 | ○ |
| Comp. Ex. 9 | C.I. Pigment Violet 19 | 12.0 | None | — | 25.7 | 43.5 | 742 | 329 | 2.26 | 0 | X |
| Ex. 17 | | 10.6 | C | 1.4 | 25.7 | 42.1 | 76 | 53 | 1.43 | −0.3 | Δ |
| Ex. 18 | | 10.6 | F | 1.4 | 25.7 | 42.1 | 92 | 65 | 1.42 | −0.2 | Δ |
| Comp. Ex. 10 | C.I. Pigment Red 279 | 12.0 | None | — | 25.7 | 43.5 | 1675 | 688 | 2.43 | 0 | X |
| Ex. 19 | | 10.8 | C | 1.2 | 25.7 | 42.3 | 53 | 35 | 1.51 | −0.2 | ◎ |
| Ex. 20 | | 10.8 | E | 1.2 | 25.7 | 42.3 | 57 | 46 | 1.24 | −0.2 | ◎ |

*) In Tables 1A to 1C, the pigments used were as follow:
C. I. Pigment Red 202: CINQUASIA MAGENTA RT-235-D (available from Chiba Specialty Chemicals)
C. I. Pigment Red 122: HOSTAPERM PINK E (available from Clariant)
C. I. Pigment Violet 19: HOSTAPERM RED E5B 02 (available from Clariant)
C. I. Pigment Red 279: NOVOPERM THI RED 4G70 (available from Clariant)

EXAMPLE 26

Synthesis of Pigment Dispersant Represented by Formula (xxix) Above 30 parts of cis-thiazineindigo pigment represented by Formula (B) above were added to 300 parts of chlorosulfonic acid at room temperature. The mixture was stirred at room temperature for 7 hours, and then added dropwise to 1500 parts of ice water over 15 minutes. The precipitated cis-thiazineindigo sulfonyl chloride was filtered and washed with 3000 parts of ice water, affording cis-thiazineindigo sulfonyl chloride press cake. Into 3 L beaker, 500 parts of ice, 500 parts of acetone and 45.7 parts of 4-amino-N-[3-(diethylamino)propyl]benzimide were charged, and then the cis-thiazineindigo sulfonyl chloride press cake was added at 2-5° C. The mixture was heated to 60° C. and stirred for 2 hours. The product was filtered, washed with water and dried at 80° C., affording 34 parts of cis-thiazineindigo pigment dispersant. Into a 200 mL four-neck flask, 100 parts of N,N-dimethylformamide and 34 parts of cis-thiazineindigo pigment dispersant thus obtained were charged. The mixture was stirred at 150° C. for 3 hours and then added to 800 mL of water. The product was filtered, washed with water and dried at 80° C., affording 24 parts of pigment dispersant represented by Formula (xxix) above.

Figure 3:
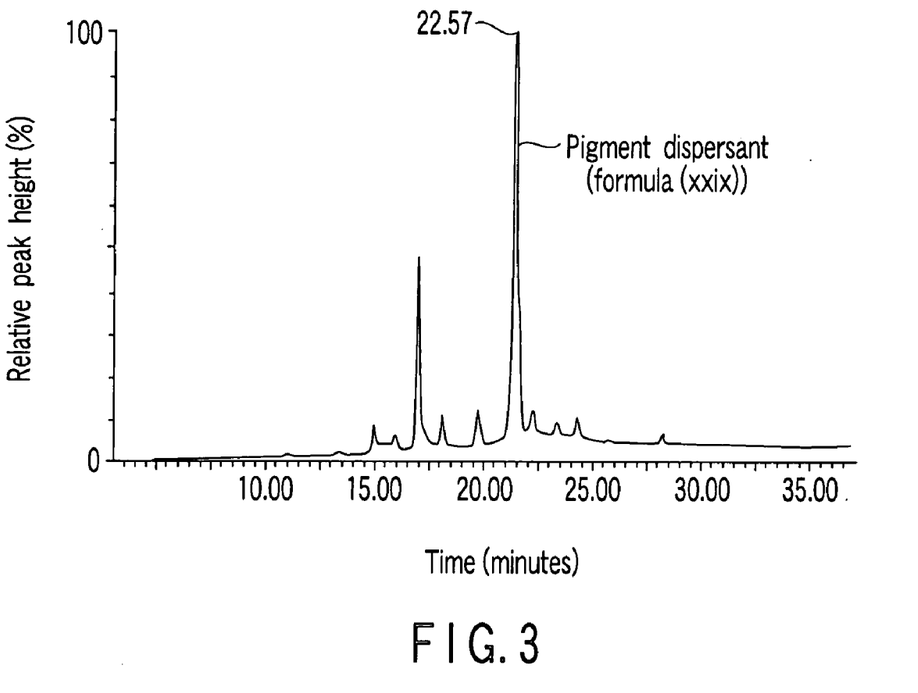
FIG. 3 illustrates a column liquid chromatogram of the pigment dispersant prepared in Example 26 which will be described below.

The molecular weight of this pigment dispersant, i.e., 949.19, was confirmed by a mass spectrometry. The purity was 57.20%, as determined by a column liquid chromatography. The liquid chromatography was carried out under the same conditions as in Example 1. The liquid column chromatogram of this pigment dispersant is illustrated in FIG. 3.

EXAMPLE 27

Synthesis of Pigment Dispersant Represented by Formula (xx) Above

30 parts of cis-thiazineindigo pigment represented by Formula (B) above were added to 300 parts of chlorosulfonic acid at room temperature. The mixture was stirred at room temperature for 7 hours, and then added dropwise to 1500 parts of ice water over 15 minutes. The precipitated cis-thiazineindigo sulfonyl chloride was filtered and washed with 3000 parts of ice water, affording cis-thiazineindigo sulfonyl chloride press cake. Into 3 L beaker, 500 parts of ice, 500 parts of acetone and 27 parts of diethylamine were charged, and then the cis-thiazineindigo sulfonyl chloride press cake was added at 2-5° C. The mixture was heated to 60° C. and stirred for 2 hours. The product was filtered, washed with water and dried at 80° C., affording 30 parts of cis-thiazineindigo pigment dispersant. Into a 200 mL four-neck flask, 100 parts of N,N-dimethylformamide and 30 parts of cis-thiazineindigo pigment dispersant thus obtained were charged. The mixture was stirred at 150° C. for 3 hours and then added to 800 mL of water. The product was filtered, washed with water and dried at 80° C., affording 24 parts of pigment dispersant represented by Formula (xx) above.

Figure 4:
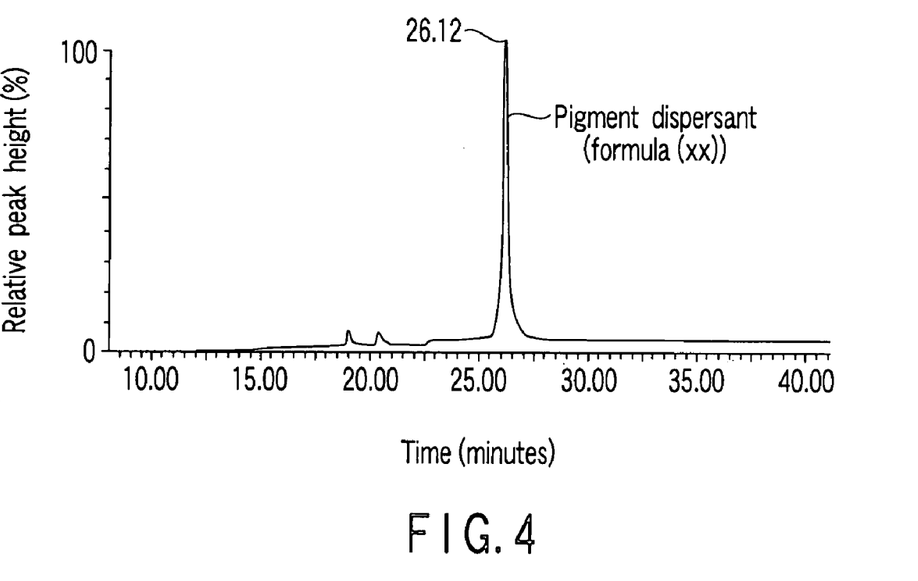
FIG. 4 illustrates a column liquid chromatogram of the pigment dispersant prepared in Example 27 which will be described below.

The molecular weight of this pigment dispersant, i.e., 596.76, was confirmed by a mass spectrometry. The purity was 87.61%, as determined by a column liquid chromatography. The liquid chromatography was carried out under the same conditions as in Example 1. The liquid column chromatogram of this pigment dispersant is illustrated in FIG. 4.

What is claimed is:

1. A trans-thiazineindigo pigment dispersant represented by Formula (1):

where:
R$_1$ denotes a group required to form an aromatic or aliphatic carbocyclic ring or a heterocyclic ring which may have a substituent other than the -(E)$_p$- group;
R$_2$ denotes a group required to form an aromatic or aliphatic carbocyclic ring or a heterocyclic ring which may have a substituent other than the -(E)$_p$- group;
E denotes a basic group substituted on the carbocyclic ring or heterocyclic ring including R$_1$ and/or on the carbocyclic ring or heterocyclic ring including R$_2$ and is represented by Formula (3):

Formula (3)

X denotes —S—, —O—, —SO$_2$—, —SO$_2$NR—, —NRSO$_2$—, —CH$_2$NRCOCH$_2$NR— or —(CH$_2$)$_m$NH—, wherein each R independently denotes a hydrogen atom, an alkyl group having 1 to 20 carbon atoms, which may have a substituent, an alkenyl group having 2 to 20 carbon atoms, which may have a substituent, or an aryl group having 6 to 20 carbon atoms, which may have a substituent, and m denotes an integer of 1 to 10;
a denotes 0 or 1;
Y denotes an alkylene group having 1 to 20 carbon atoms, which may have a substituent, an alkenylene group having 2 to 20 carbon atoms, which may have a substituent, an arylene group having 6 to 20 carbon atoms, which may have a substituent, or a heterocyclic group containing a nitrogen, oxygen or sulfur atom, or two or more of these groups may be bonded together directly or through a linking group selected from —NR—, —O—, —SO$_2$— and —CO—, wherein R is as defined above;
b denotes 0 or 1;
R$_3$ and R$_4$ each independently denotes an alkyl group having 1 to 30 carbon atoms, which may have a substituent, or an alkenyl group having 2 to 30 carbon atoms, which may have a substituent, or R$_3$ and R$_4$, taken together, may form a heterocyclic group containing a nitrogen, oxygen or sulfur atom; and
p denotes an integer of 1 to 6.

2. A cis-thiazineindigo pigment dispersant represented by Formula (2):

where:
R$_1$ denotes a group required to form an aromatic or aliphatic carbocyclic ring or a heterocyclic ring which may have a substituent other than the -(E)$_p$- group;
R$_2$ denotes a group required to form an aromatic or aliphatic carbocyclic ring or a heterocyclic ring which may have a substituent other than the -(E)$_p$- group;
E denotes a basic group substituted on the carbocyclic ring or heterocyclic ring including R$_1$ and/or on the carbocyclic ring or heterocyclic ring including R$_2$ and is represented by Formula (3):

Formula (3)

X denotes —S—, —O—, —SO$_2$—, —SO$_2$NR—, —NRSO$_2$—, —CH$_2$NRCOCH$_2$NR— or —(CH$_2$)$_m$NH—, wherein each R independently denotes a hydrogen atom, an alkyl group having 1 to 20 carbon atoms, which may have a substituent, an alkenyl group having 2 to 20 carbon atoms, which may have a substituent, or an aryl group having 6 to 20 carbon atoms, which may have a substituent, and m denotes an integer of 1 to 10;
a denotes 0 or 1;
Y denotes an alkylene group having 1 to 20 carbon atoms, which may have a substituent, an alkenylene group having 2 to 20 carbon atoms, which may have a substituent, an arylene group having 6 to 20 carbon atoms, which may have a substituent, or a heterocyclic group containing a nitrogen, oxygen or sulfur atom, or two or more of these groups may be bonded together directly or through a linking group selected from —NR—, —O—, —SO$_2$— and —CO—, wherein R is as defined above;
b denotes 0 or 1;
R$_3$ and R$_4$ each independently denotes an alkyl group having 1 to 30 carbon atoms, which may have a substituent, or an alkenyl group having 2 to 30 carbon atoms, which may have a substituent, or R₃ and R₄, taken together, may form a heterocyclic group containing a nitrogen, oxygen or sulfur atom; and p denotes an integer of 1 to 6.

3. The pigment dispersant according to claim 1, wherein X denotes —S—, —SO₂—, or —SO₂NR—.

4. The pigment dispersant according to claim 2, wherein X denotes —S—, —SO₂—, or —SO₂NR—.

5. A pigment composition comprising a pigment material, and a trans-thiazine indigo pigment dispersant according to claim 1.

6. A pigment composition comprising a pigment material, and a cis-thiazine indigo pigment dispersant according to claim 2.

7. The pigment composition according to claim 5, wherein the pigment material comprises a diketopyrrolopyrrole-based red pigment, a quinacridone-based red pigment, a thiazine indigo-based red pigment, or anthraquinone-based red pigment.

8. The pigment composition according to claim 6, wherein the pigment material comprises a diketopyrrolopyrrole-based red pigment, a quinacridone-based red pigment, a thiazineindigo-based red pigment, or anthraquinone-based red pigment.

9. The pigment composition according to claim 5, wherein the pigment material further comprises a yellow pigment.

10. The pigment composition according to claim 8, wherein the pigment material further comprises a yellow pigment.

11. A colored composition comprising a pigment composition according to claim 5 and a pigment carrier.

12. A colored composition comprising a pigment composition according to claim 6 and a pigment carrier.

13. A colored composition comprising a pigment composition according to claim 7 and a pigment carrier.

14. A colored composition comprising a pigment composition according to claim 8 and a pigment carrier.

15. A colored composition comprising a pigment composition according to claim 9 and a pigment carrier.

16. A colored composition comprising a pigment composition according to claim 10 and a pigment carrier.

17. A color filter comprising a filter segment prepared from a colored composition according to claim 11.

18. A color filter comprising a filter segment prepared from a colored composition according to claim 12.

19. A color filter comprising a filter segment prepared from a colored composition according to claim 13.

20. A color filter comprising a filter segment prepared from a colored composition according to claim 14.

21. A color filter comprising a filter segment prepared from a colored composition according to claim 15.

22. A color filter comprising a filter segment prepared from a colored composition according to claim 16.

* * * * *